United States Patent
Separautzki et al.

(10) Patent No.: US 6,293,630 B1
(45) Date of Patent: Sep. 25, 2001

(54) WHEEL FOR A VEHICLE, PARTICULARLY A SPARE WHEEL FOR A MOTOR VEHICLE

(75) Inventors: Reinhold Separautzki, Moeglingen; Jens Stach, Heimsheim, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/257,206

(22) Filed: Feb. 25, 1999

(30) Foreign Application Priority Data

Feb. 25, 1998 (DE) .............................. 198 07 943

(51) Int. Cl.$^7$ ....................................... B60B 3/10
(52) U.S. Cl. ............................................. 301/64.2
(58) Field of Search ................. 301/63.1, 64.3, 301/65, 35.1, 35.62, 64.2, 64.4, 64.5

(56) References Cited

U.S. PATENT DOCUMENTS

| | | | |
|---|---|---|---|
| 4,330 | * 12/1845 | Eddy | 301/65 |
| 5,953 | * 12/1848 | Cook | 301/65 |
| 1,148,745 | * 8/1915 | Boardman | 301/64.3 |
| 1,610,023 | * 12/1926 | Meldrum | 301/65 |
| 3,771,843 | * 11/1973 | Clasper et al. | 301/63.1 |
| 3,915,511 | * 10/1975 | Clasper et al. | 301/63.1 |
| 5,257,455 | * 11/1993 | Iwatsuki | 301/63.1 |
| 5,360,261 | * 11/1994 | Archibald et al. | 301/63.1 |
| 5,429,422 | * 7/1995 | Baldi | 301/65 |
| 5,490,720 | * 2/1996 | Archibald | 301/35.62 |
| 5,538,329 | * 7/1996 | Stach | 301/65 |
| 5,575,539 | * 11/1996 | Stach | 301/65 |
| 5,782,540 | * 7/1998 | Camfield et al. | 301/64.2 |

FOREIGN PATENT DOCUMENTS

| | | |
|---|---|---|
| 32 05 235 | 9/1983 | (DE) . |
| 37 38 362 | 6/1989 | (DE) . |
| 0 315 897 | 5/1989 | (EP) . |
| 560 741 | 1/1923 | (FR) . |
| 63-258202 | 10/1988 | (JP) . |
| 3315302 | * 12/1988 | (JP) ............... 301/64.3 |

* cited by examiner

Primary Examiner—S. Joseph Morano
Assistant Examiner—Long Bao Nguyen
(74) Attorney, Agent, or Firm—Crowell & Moring, LLP

(57) ABSTRACT

A wheel for a vehicle, particularly a spare wheel for a motor vehicle, has an outer and an inner rim disk which are connected with one another, these rims disks together forming a rim well. The ring disks have interior and exterior ring webs which are spaced with respect to one another and extend approximately in the wheel axis direction and have corresponding facing connection surfaces. Together with the walls of the two rim disks, the ring webs have an annulus which extends around the wheel hub and from it close toward the rim well of the wheel in a limited manner.

1 Claim, 5 Drawing Sheets

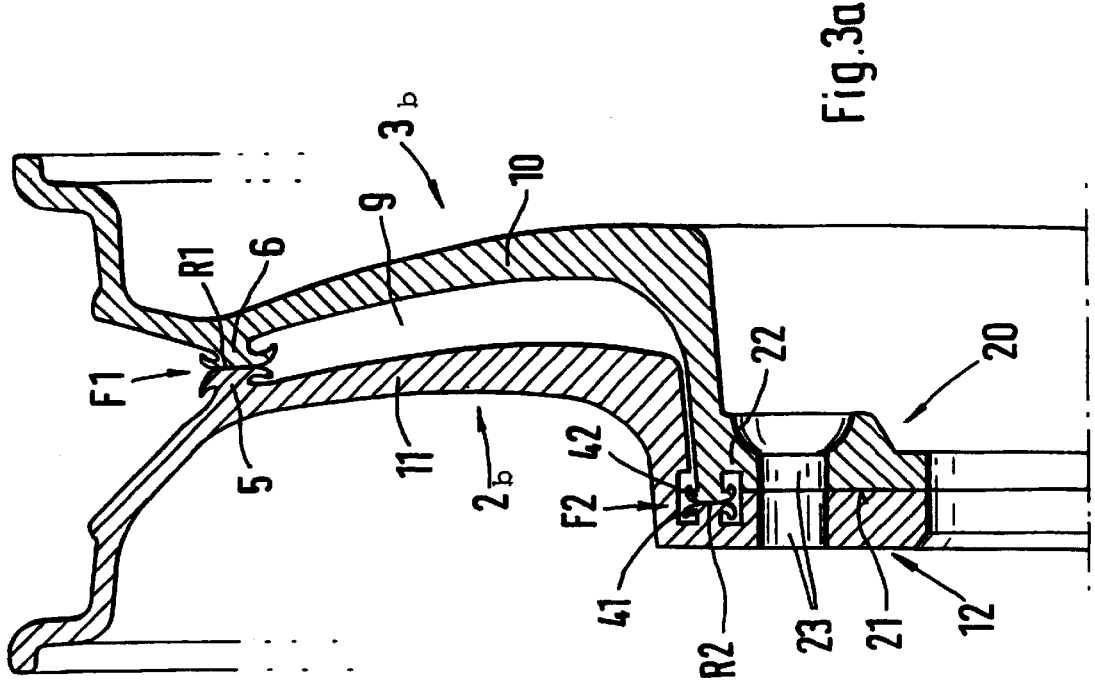
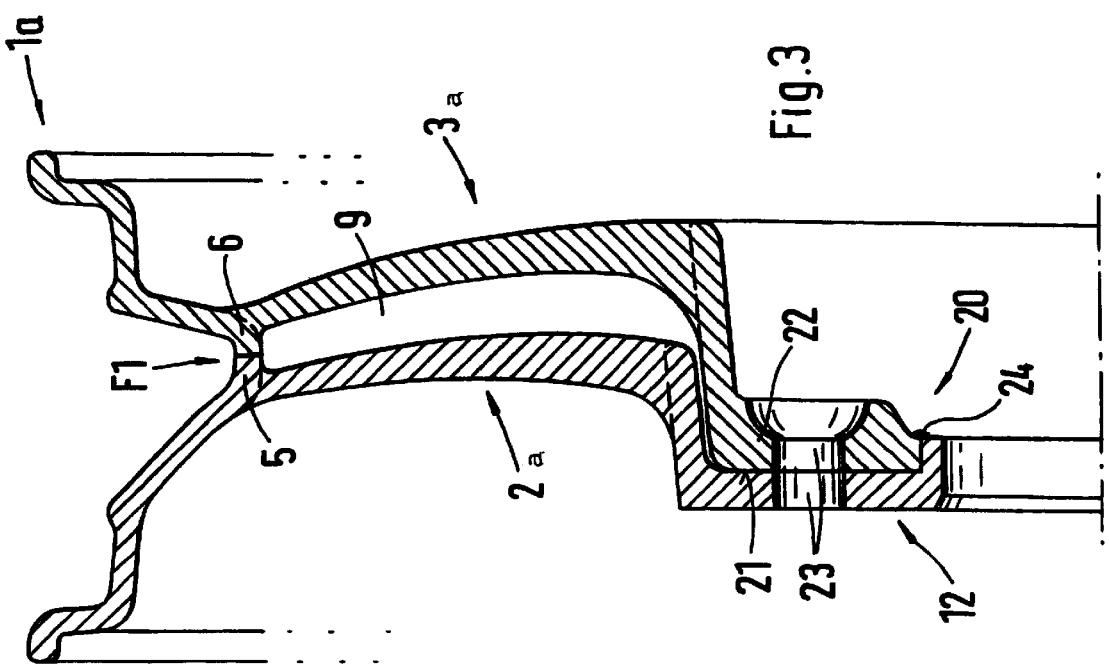

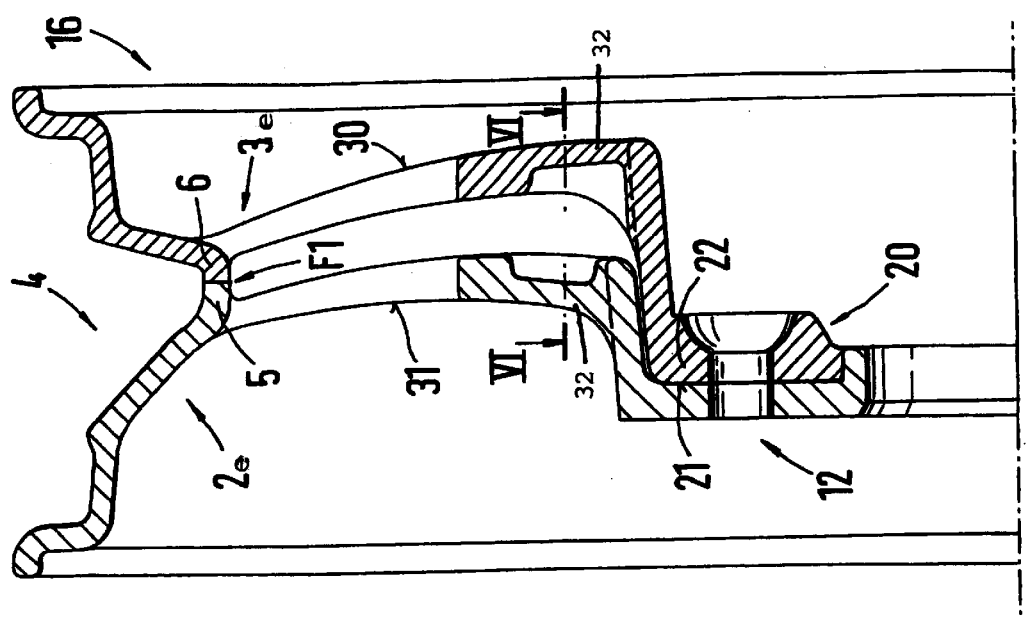
Fig. 5
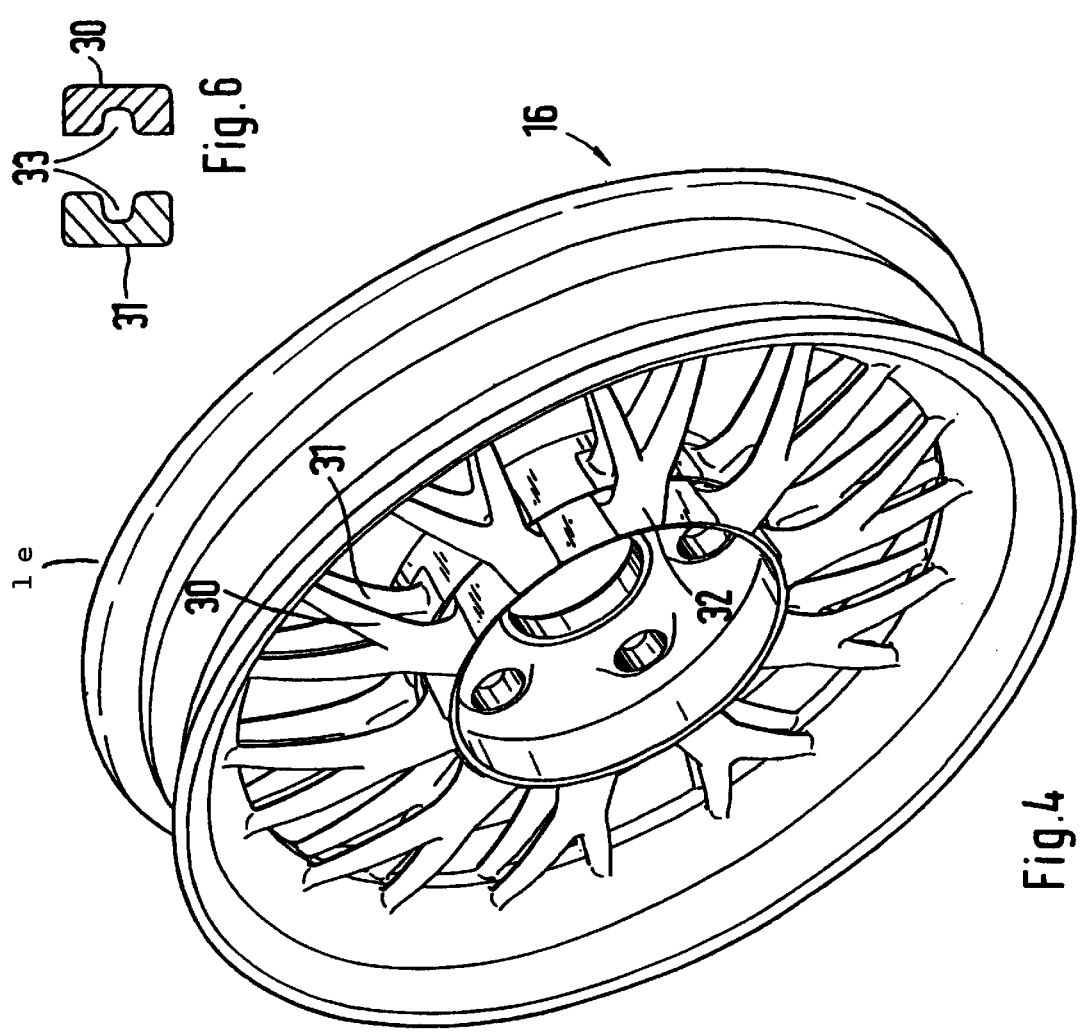
Fig. 6
Fig. 4

WHEEL FOR A VEHICLE, PARTICULARLY A SPARE WHEEL FOR A MOTOR VEHICLE

BACKGROUND AND SUMMARY OF THE INVENTION

This application claims the priority of German patent 198 07 943.5, filed Feb. 25, 1998, the disclosure of which is expressly incorporated by reference herein.

The invention relates to a wheel for a vehicle, particularly a spare wheel for a motor vehicle, which comprises an outer and an inner rim disk which are connected with one another, the rim parts jointly forming a rim well.

From German Patent Document DE 37 38 362 A1, a wheel for a motor vehicle is known which comprises four rim parts which are connected with one another by means of screwing. The rim is fastened to a rim spider which also consists of two pieces and which is constructed so that it can be fitted together in the hub area.

Furthermore, a wheel is known from German Patent Document DE 32 05 235 A1 which consists of two rim disks which together form a rim well. The rim disks are connected with one another by means of welds, a hollow space being formed between the welds.

It is an object of the invention to provide a wheel for a vehicle, particularly a spare wheel for a motor vehicle, which can be produced in a simple manner and as a light-weight construction and ensures a corresponding stability as a safety element.

According to the invention, this and other objects have been achieved by providing a wheel for a vehicle, comprising: an axially outer rim disk having a disk wall extending approximately radially; and an axially inner rim disk having a disk wall extending approximately radially, at least one of said outer rim disk and said inner rim disk forming a rim well, at least one of said outer rim disk and said inner rim disk forming a wheel hub, at least one of said outer rim disk and said inner rim disk forming an outer annular web proximate the rim well, said outer annular web extending approximately axially, at least one of said outer rim disk and said inner rim disk forming an inner annular web located radially inside of said outer annular web, said inner annular web extending approximately axially, said outer and inner rim disks being connected with each other at said outer annular web, said outer and inner rim disks being connected with each other at said inner annular web or at a location proximate said wheel hub, said outer annular web, said inner annular web, and said disk walls of said outer and inner rim disks defining an annulus.

According to the invention, this and other objects have been achieved by providing a wheel for a vehicle, comprising: an axially outer rim disk having a disk wall extending approximately radially; and an axially inner rim disk having a disk wall extending approximately radially, at least one of said outer rim disk and said inner rim disk forming a rim well, at least one of said outer rim disk and said inner rim disk forming a wheel hub, at least one of said outer rim disk and said inner rim disk forming an outer annular web proximate the rim well, said outer annular web extending approximately axially, said outer and inner rim disks being connected with each other at said outer annular web, said outer and inner rim disks forming a plug-type connection in an area proximate said wheel hub, said outer annular web and said disk walls of said outer and inner rim disks defining an annulus.

According to the invention, this and other objects have been achieved by providing a wheel for a vehicle, comprising two wheel parts which can be connected with one another and which together form a wheel hub, a rim well, annular webs proximate the rim well, and rim spiders including spokes arranged between the annular webs and the wheel hub.

According to the invention, this and other objects have been achieved by providing a wheel for a motor vehicle, comprising two rim disks which are connected with one another and together form a rim well, wherein the inner rim disk is constructed in one piece with a wheel hub and, between connection webs, forms a portion of an annulus which is supplemented by another outer rim disk, which has no wheel hub part.

The wheel according to the invention consists essentially of two rim disks which can be connected by way of corresponding face-side connection surfaces to molded-on ring webs. Advantageously, the two rim parts, specifically the outer and the inner rim disk, may be manufactured of the same or of different materials, such as light metal alloys (Mg, Al, titanium) or of a plastic material. It is also possible to produce the rim parts of pressed sheet metal as well as by casting.

For connecting the two rim parts, these rim parts have spaced ring webs which can be connected with one another, for example, by means of a weld, such as an electron beam weld or a friction weld or similar weld. A glued connection is also possible. According to another embodiment, a combination of gluing and welding and/or a screwed connection with a partial fitting-together is also contemplated.

The rim parts are formed out in such a manner that an annulus is created between the rim well and the wheel hub. This annulus is bounded on one side by the ring webs and is bounded on the other side by the corresponding walls of the rim disks. By means of this formed annulus, an additional stiffness is achieved.

The construction of the two rim disks is selected such that the annulus is bounded by an outer ring web of a relatively narrow width and of an inner ring web of a relatively large width of the outer rim disk. These ring webs are adjoined by the corresponding relatively narrow ring webs of the inner rim disk, which have approximately the same width.

The wheel hub is preferably formed in one piece to the inner rim disk. The outer rim disk only has a wall for forming the annulus and no wheel house part. Both rim disks together form a rim well for receiving a tire.

The face-side connection surfaces of the ring webs of both rim disks are arranged in almost the same connection plane so that, for example, by means of a single electron beam weld, both connection surfaces can be connected with one another by this welding operation.

The walls of the rim disks are constructed to be slightly curved toward the outside, so that the annulus extends on one side of a longitudinal wheel center plane, and the wheel hub is arranged on another side of the longitudinal wheel center plane. This wheel hub forms the floor of a pot-shaped indentation in the outer rim disk.

For reinforcing the two rim disks, ribs can advantageously also be formed according to the invention within the annulus to the inside walls of one or both rim disks. These ribs may be directly mutually opposite one another, or extend radially and/or transversely or in a ringshaped manner. Ribs are also contemplated on only one interior wall which then extend to the other wall of the opposite rim disk. It is also contemplated that the ribs on the walls of the two rim disks are positioned to fill gaps or engage in one another in a tooth-shaped manner.

According to another embodiment according to the invention, the wheel hub is formed by the two rim disks which can be fitted together in this area, for example, by means of a press fit. For this purpose, a ring-shaped indentation is provided in the inner rim disk; and a correspondingly projecting ring web is provided in the outer rim disk. The connection takes place by means of wheel studs and/or an additional connection by means of welding or gluing. The additional connection in the area of the rim well takes place as in the case of the above-mentioned embodiment.

According to another advantageous embodiment of the invention, the rim disks are constructed as rim spiders having ribs, the connection of the rim parts taking place according to the above-mentioned embodiments.

Other objects, advantages and novel features of the present invention will become apparent from the following detailed description of the invention when considered in conjunction with the accompanying drawings.

BRIEF DESCRIPTION OF THE DRAWINGS

FIG. 3 is a sectional view of another preferred embodiment of a two-part wheel according to the present invention with a common wheel hub construction;

FIG. 3a is a sectional view of another preferred embodiment with friction-weldable ring webs of the two rim disks;

FIG. 4 is a perspective view of a two-part wheel having spokes according to another preferred embodiment; and FIG. 5 is a sectional view of the wheel according to FIG. 4; and FIG. 6 is a sectional view of the wheel in the area of the spokes according to Line VI—VI of FIG. 5.

DETAILED DESCRIPTION OF THE DRAWINGS

Figure 1:
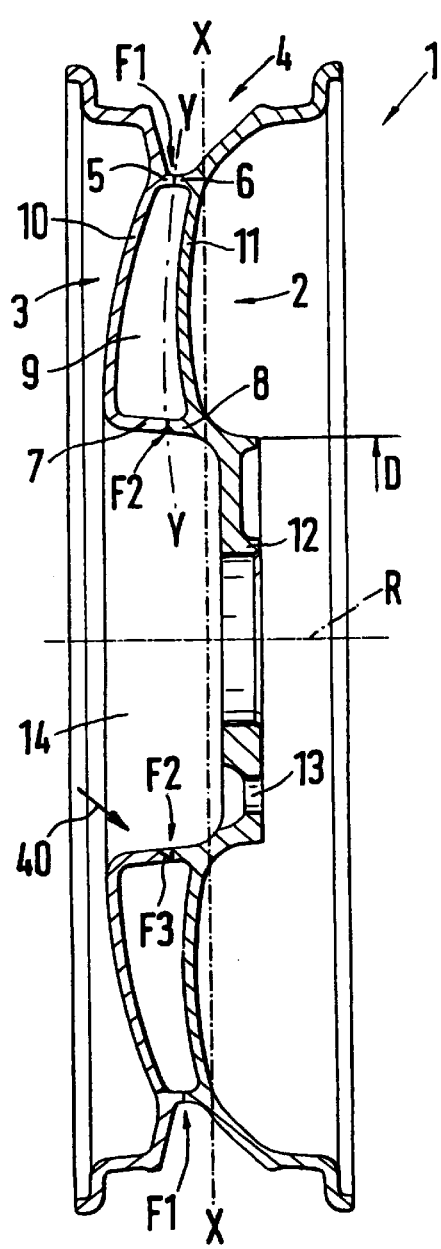
FIG. 1 is a sectional view of a two-part wheel with an outer and inner rim disks according to a preferred embodiment of the present invention.

A wheel 1, particularly a spare wheel for a motor vehicle, consists of two rim disks, such as an inner rim disk 2 and an outer rim disk 3. The rim disks are connected with one another by means of welding or gluing. In addition or instead, a connection by means of screwing may take place.

The rim disks 2, 3 together form a rim well 4 and are connected with one another by way of face-side connection surfaces F1 and F2 on opposite ring webs (i.e., annular webs) 5, 6 and 7, 8. These connection surfaces are radially spaced with respect to one another and define an annulus 9 between one another which, on one side, is bounded by the ring webs 5, 6 and 7,8 and, on the other side, is bounded by the walls 10, 11 of the two disks 3, 2.

The outer rim disk 3 comprises a portion or a half of the rim well 4 and, by a corresponding forming-out of the wall, forms a portion of the annulus 9. A wheel hub construction does not exist on this rim disk 3. The inner rim disk 2 forms the other portion of the rim well 4 and is provided with a formed-on wheel hub 12 which has bores 13 for wheel bolts.

The wheel hub 12 and the annulus 9 are each arranged on different sides of a longitudinal wheel center plane X—X, each of the two rim disks 2, 3 forming approximately half of the rim well 4.

The outer ring webs 5, 6 of the rim disks are arranged in the base of an indentation of the rim well 4. The inner ring webs 7, 8 extend almost as an extension of the outer diameter D of the wheel hub 12 in a common plane concentrically to the wheel axis R.

For the construction of an annulus 9 which has an approximately trapezoidal cross-section or another geometrical shape, the ring webs 5, 6 have a relatively narrow construction and the connection web 7 has a wider construction than the connection webs 5, 6 and 8. The webs 7 and 8 enclose a pot-shaped space 14 on an interior side along with the wheel hub 12 of the inner rim disk 2. At least one rib 50 is contemplated inside the annulus 9. This rib may extend circularly, transversely or at an angle or diagonally in space and may be arranged on one or both walls 10, 11 of the rims disks 2, 3. The ribs of the rim disk 2, 3 may be directly opposite one another or be arranged on only one wall and extend to the other wall. A tooth-shaped engagement is also contemplated, in which case the ribs may each be arranged opposite one another to fill gaps.

Figure 2:
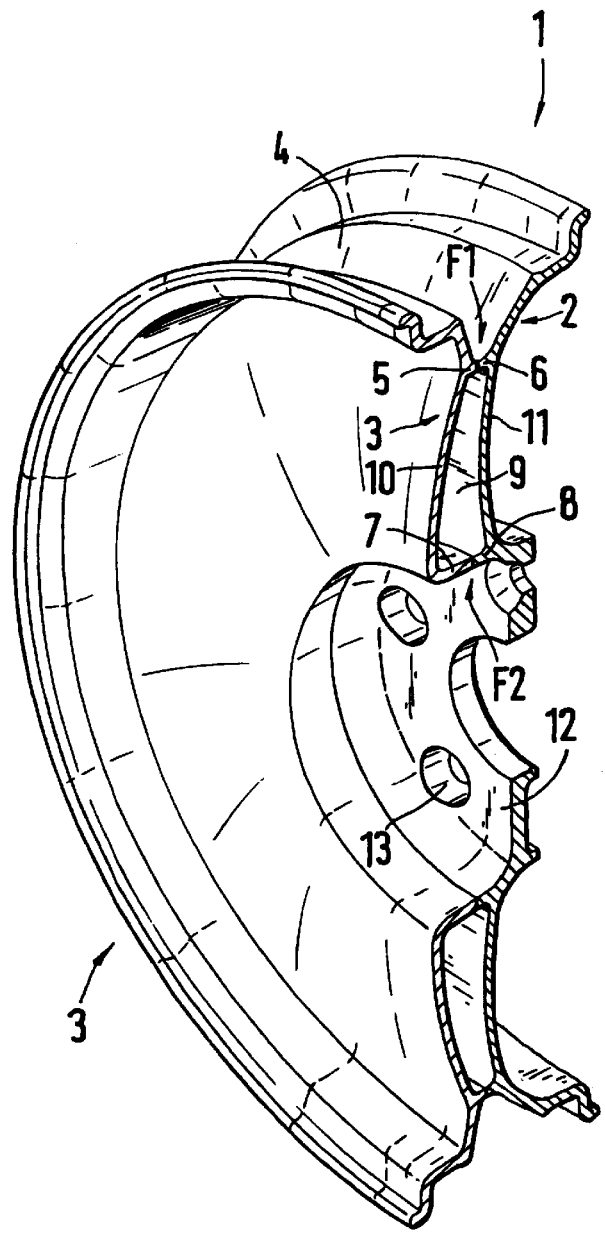
FIG. 2 is a perspective view of the wheel according to FIG. 1.
Figure 2A:
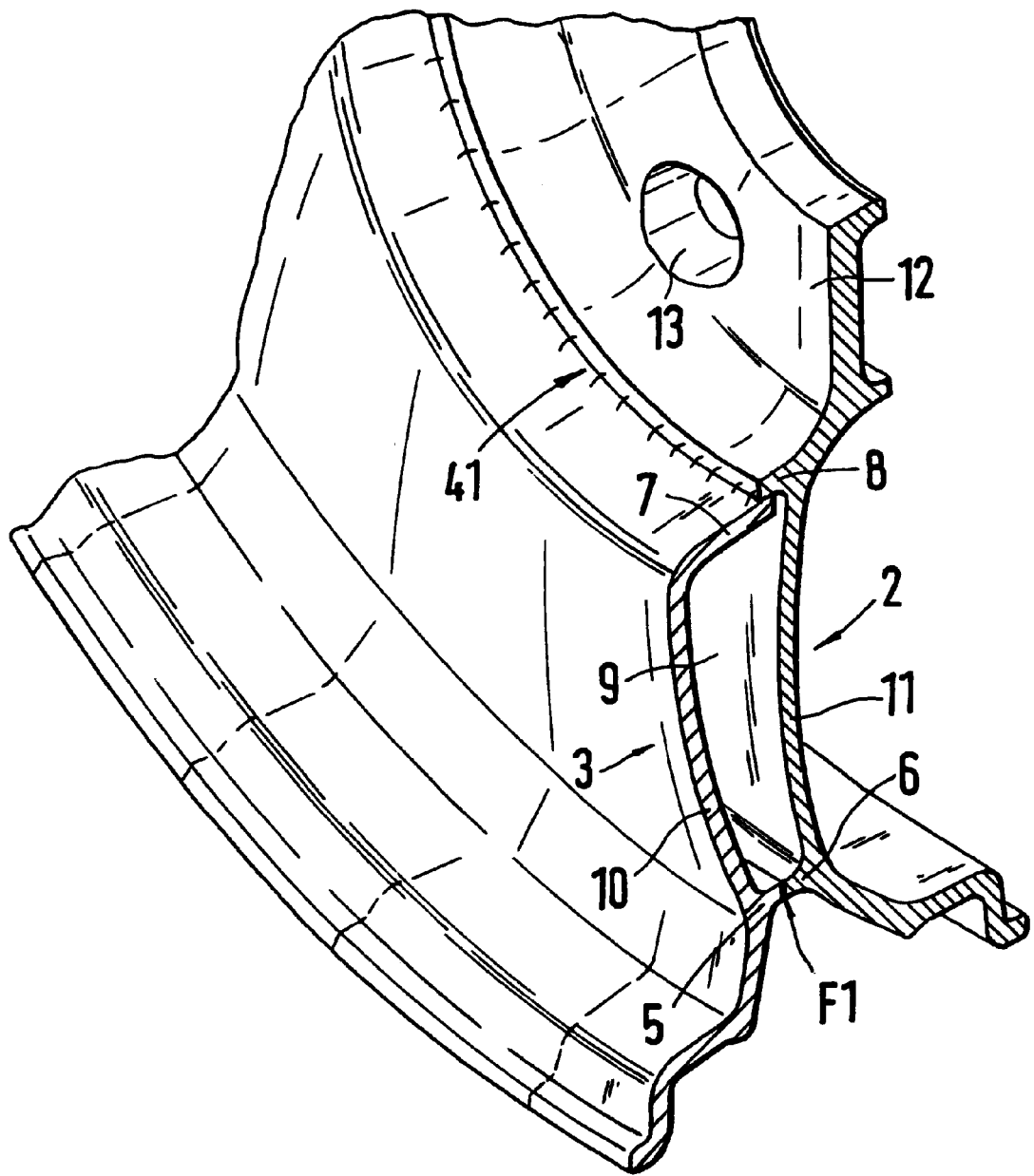
FIG. 2a is a perspective view of the two rim disks with mutually ove lapping ring webs.

According to an embodiment corresponding to FIG. 2a, the inner ring webs 7, 8 do not abut one another obtusely but overlap one another. The ring web 8 is preferably arranged on the interior side with respect to the ring web 7. A connection by a weld or a adhesive (e.g., glue) takes place along the ring edge between the two ring webs 7 and 8.

According to another embodiment corresponding to FIG. 3, the wheel 1a consists of an outer and an inner rim disk 3a, 2a which, on the one side, are fastened by way of the connection surface F1 to the ring webs 5, 6 and, on the other side, are fastened to one another by way of a plug-type connection 20 in the area of the wheel hub 12.

The plug-type connection 20 essentially comprises a ring-type indentation 21 on the inner rim disk 2a, in which indentation 21 a projecting ring 22 of the rim disk 3a is held in a fitted manner. A connection takes place by way of the wheel bolts to be inserted into the bores 23. In addition, a glued connection and/or welded connection in the ring area 24 may also take place.

Figure 3B:
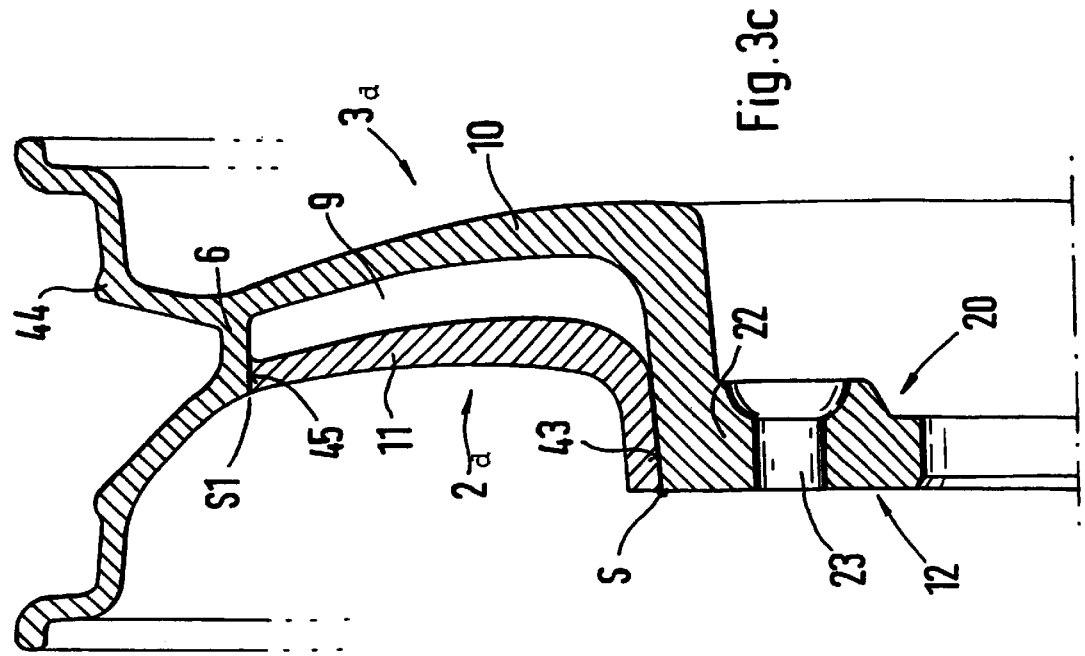
FIG. 3b is a sectional view of another preferred embodiment with a ring of the outer rim disk fitted into an opening of he inner rim disk.

According to another embodiment corresponding to FIGS. 3a and 3b, the connection surfaces F1 of the ring webs 5 and 6 are connected with one another by means of a friction weld R1. Furthermore, another connection by way of a friction weld R2 is provided in the area of the wheel hub 12. In this embodiment, corresponding to FIG. 3, the hub area is constructed as a plug-type connection 20, the rim disk 3b having a projecting ring 22, and the rim disk 2b having a ring-type indentation 21. In the ring-type indentation 21 as well as in the ring 22, opposing rings 41, 42 are formed which are connected with one another by way of the friction weld R2.

In the embodiment corresponding to FIG. 3b, the ring 22 of the rim disk 3c is fitted into an opening 43 of the rim disk 2c, the ring 22 ending approximately flush with the outer surface of the opening 43. A connection of the two rim disks 2c, 3c takes place between the ring 22 and the edge of the opening 43 by way of a weld S.

Figure 3C:
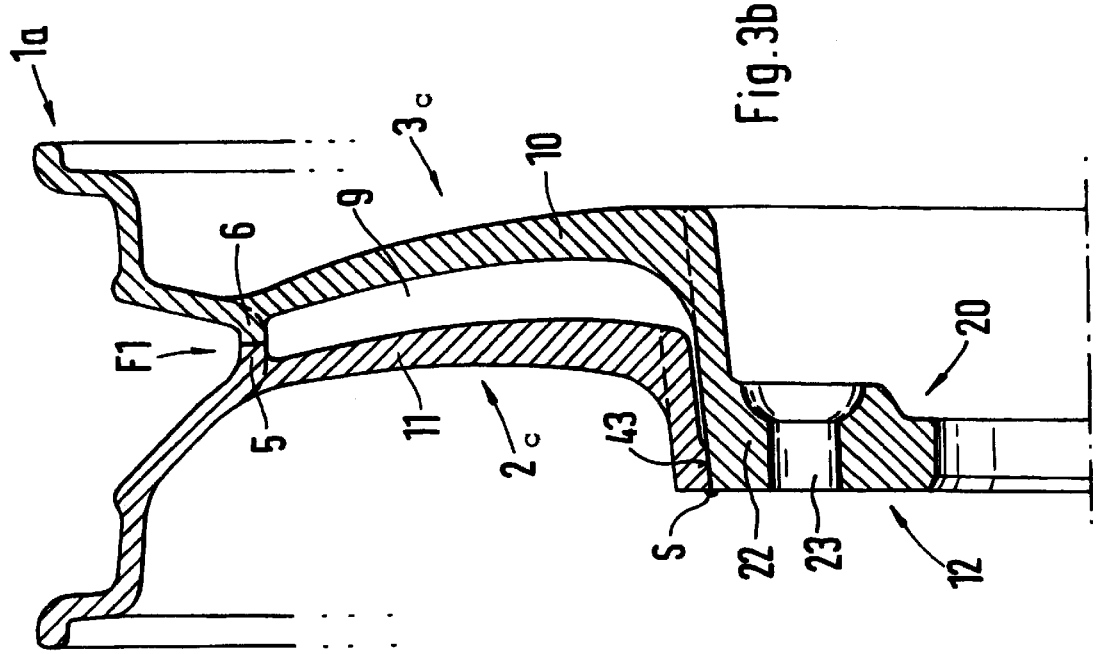
FIG. 3c is a sectional view of another preferred embodiment of a wheel consisting of two rim disks, in the case of which the outer rim disk is constructed in one piece with the rim.

In the embodiment according to FIG. 3c, the hub area with the ring 22 and the opening 43 is constructed corresponding to the embodiment of FIG. 3b. The connection of the rim 44, which forms a component with the rim disk 3d, with the rim disk 2d takes place by way of a weld S1. For this purpose, the ring web 6 is connected with the rim 44, and the edge 45 of the rim disk 2d abuts obtusely on the rim and is connected with it by way of the weld S1.

According to another embodiment corresponding to FIGS. 4, 5 and 6, the rim disks of the wheel 1e, as so-called rim spiders 2e, 3e, are provided with spokes 30, 31. The connection of the two rim spiders 2e and 3e takes place in the area of the rim well 4 by way of the connection surface F1 of the ring webs 5 and 6. The additional connection in the area of the wheel hub 12 takes place, as according to the embodiments of FIG. 3, by means of a plug-type connection 20. As illustrated in detail according to FIG. 6, the spokes 30, 31 are provided with a reduced cross-section in the base 32 by means of a radial groove 33 of a limited length.

The connection of the webs 5, 6 and 7, 8 takes place by way of a weld. So that the welding direction (direction of arrow 40 in FIG. 1) is optimal, the connection surface F3 between the ring webs 7, 8 may also have a diagonal construction, as illustrated in detail in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wheel for a vehicle, comprising:

an axially outer rim disk having a disk wall extending approximately radially; and an axially inner rim disk having a disk wall extending approximately radially, at least one of said outer rim disk and said inner rim disk forming a rim well, at least one of said outer rim disk and said inner rim disk forming a wheel hub, at least one of said outer rim disk and said inner rim disk forming an outer annular web proximate the rim well, said outer annular web extending approximately axially, at least one of said outer rim disk and said inner rim disk forming an inner annular web located radially inside of said outer annular web, said inner annular web extending approximately axially, said outer and inner rim disks being connected with each other at said outer annular web, said outer and inner rim disks being connected with each other at said inner annular web, said outer annular web, said inner annular web, and said disk walls of said outer and inner rim disks defining an annulus, wherein said annulus is located on one side of a longitudinal center plane of the wheel, and the wheel hub which defines wheel bolt openings is arranged on the other side of the longitudinal center plane.

* * * * *